(12) United States Patent
Fukunaga et al.

(10) Patent No.: US 11,456,487 B2
(45) Date of Patent: Sep. 27, 2022

(54) METHOD FOR MANUFACTURING SECONDARY BATTERY

(71) Applicants: Panasonic Corporation, Kadoma (JP); SANYO Electric Co., Ltd., Daito (JP)

(72) Inventors: Masao Fukunaga, Hyogo (JP); Mamoru Kuramoto, Hyogo (JP)

(73) Assignees: PANASONIC HOLDINGS CORPORATION, Kadoma (JP); SANYO Electric Co., Ltd., Daito (JP)

( * ) Notice: Subject to any disclaimer, the term of this patent is extended or adjusted under 35 U.S.C. 154(b) by 402 days.

(21) Appl. No.: 16/303,900

(22) PCT Filed: May 23, 2017

(86) PCT No.: PCT/JP2017/019111
§ 371 (c)(1),
(2) Date: Nov. 21, 2018

(87) PCT Pub. No.: WO2017/204184
PCT Pub. Date: Nov. 30, 2017

(65) Prior Publication Data
US 2020/0321658 A1 Oct. 8, 2020

(30) Foreign Application Priority Data
May 27, 2016 (JP) .............................. JP2016-106003

(51) Int. Cl.
*H01M 10/0585* (2010.01)
*H01M 4/04* (2006.01)
*H01M 4/02* (2006.01)

(52) U.S. Cl.
CPC ..... *H01M 10/0585* (2013.01); *H01M 4/0435* (2013.01); *H01M 2004/027* (2013.01); *H01M 2004/028* (2013.01)

(58) Field of Classification Search
CPC ........... H01M 10/0585; H01M 4/0435; H01M 2004/028
See application file for complete search history.

(56) References Cited

U.S. PATENT DOCUMENTS

2003/0104281 A1* 6/2003 Frustaci .................. H01M 4/72
429/241
2014/0011064 A1 1/2014 Matsuda et al.

FOREIGN PATENT DOCUMENTS

| CN | 103430357 A | 12/2013 |
|---|---|---|
| JP | 10-208753 A | 8/1998 |

(Continued)

OTHER PUBLICATIONS

International Search Report dated Jul. 11, 2017, issued in counterpart International Application No. PCT/JP2017/019111 (1 page).

(Continued)

*Primary Examiner* — Osei K Amponsah
(74) *Attorney, Agent, or Firm* — WHDA, LLP

(57) ABSTRACT

Provided is a method for manufacturing a secondary battery including a stacked electrode body including a plurality of positive electrode plates (1) and a plurality of negative electrode plates, the positive electrode plates (1) each having a positive electrode active material layer (1b) formed on a positive electrode substrate (1a), a positive electrode substrate exposed portion where the positive electrode active material layer (1b) is not formed on the positive electrode substrate (1a) being provided as a positive electrode tab portion (1e) at the end of the positive electrode plate (1). The method includes a cutout forming step of providing a cutout in a region at the base of the positive electrode plate (1) where the active material layer (1b) is formed, and a compressing step of compressing the positive electrode active material layer (1b) after the cutout forming step.

5 Claims, 5 Drawing Sheets

(56) References Cited

FOREIGN PATENT DOCUMENTS

| | | | |
|---|---|---|---|
| JP | 2012-248282 A | 12/2012 | |
| JP | 2013-187077 A | 9/2013 | |
| JP | 5390721 B1 | 1/2014 | |
| JP | 2014-022102 A * | 2/2014 | ............. H01M 4/02 |
| JP | 2014-22102 A | 2/2014 | |
| JP | 2015-201328 A | 11/2015 | |

OTHER PUBLICATIONS

English Translation of Office Action dated Jun. 3, 2021, issued in counterpart CN Application No. 201780032146.6 (4 pages).

\* cited by examiner

METHOD FOR MANUFACTURING SECONDARY BATTERY

TECHNICAL FIELD

The present invention relates to a method for manufacturing a secondary battery.

BACKGROUND ART

Secondary batteries such as nonaqueous electrolyte secondary batteries are used in power sources for driving electric vehicles (EV), hybrid electric vehicles (HEV, PHEV), and the like.

These secondary batteries include a positive electrode plate and a negative electrode plate in which an active material layer containing an active material is formed on the surface of a substrate composed of a metal foil. Further increase in energy density is required for secondary batteries used for electric vehicles (EV), hybrid electric vehicles (HEV, PHEV) and the like. As a method for increasing the energy density of the secondary battery, it is conceivable to further increase the packing density of the active material layer. Thereby, it is possible to increase the amount of the active material contained in the battery case and to improve the energy density. As a method for further increasing the packing density of the active material layer, for example, it is conceivable to further increase the packing density of the active material layer by compressing with a stronger force when the active material layer is compressed by roll press or the like after the active material layer is provided on the substrate.

However, when the active material layer formed on the substrate is compressed with a stronger force, not only the active material layer but also the substrate having the active material layer formed on its surface is strongly compressed, so that the substrate is rolled. Here, when a substrate exposed portion having no active material layer famed thereon is present at the end portion of the electrode plate, the substrate exposed portion has a smaller thickness than the portion having the active material layer famed thereon, so that the load of the compression treatment is not applied to the substrate exposed portion. Therefore, when the electrode plate is subjected to rolling treatment, the portion of the substrate where the active material layer is formed is rolled, but the substrate exposed portion is not rolled. Therefore, there is a difference in length between the portion of the substrate where the active material layer is famed and the substrate exposed portion. There is a problem that wrinkles are generated in the substrate and the electrode plate is curved due to the generated difference in length.

In order to solve such a problem, the following PTL 1 proposes a technique of roll-pressing the electrode plate after elongating the substrate exposed portion of the electrode plate.

CITATION LIST

Patent Literature

PTL 1: Japanese Patent No. 5390721

SUMMARY OF INVENTION

Technical Problem

An object of the present invention is to provide a highly reliable electrode plate and a secondary battery using the same.

Solution to Problem

In an aspect of the present invention, there is provided a method for manufacturing a secondary battery including a stacked electrode body including a plurality of first electrode plates and a plurality of second electrode plates, the first electrode plates each having a substrate, an active material layer famed on the substrate, and a tab portion composed of a substrate exposed portion where the active material layer is not formed. The method includes a cutout forming step of providing at least one cutout in a region of each first electrode plate that is at the base of the tab portion and in which the active material layer is formed, and a compressing step of compressing the active material layer after the cutout forming step.

The above-described configuration makes it possible to provide a highly reliable secondary battery.

The following procedure is conceivable as a manufacturing procedure of an electrode plate in which an active material layer is famed on both sides of a substrate and a substrate exposed portion as a tab portion is provided at an end.

(1) An active material layer is formed on both sides of a belt-like substrate such that a substrate exposed portion is famed along the longitudinal direction of the substrate.
(2) The substrate exposed portion is cut into a predetermined shape to form a tab portion.
(3) The belt-like electrode plate having the tab portion famed thereon is pressed to compress the active material layer.

The inventors have found that, in the case of manufacturing an electrode plate by such a procedure, if the pressing pressure in the pressing treatment of the electrode plate is increased in order to make the packing density of the active material layer higher, a crack extending in the oblique direction may be generated in the base portion of the tab portion. The cause of such a problem is considered as follows.

It has been considered that, in general, when the electrode plate is pressed after the substrate exposed portion is cut into a predetermined shape to form the tab portion, the electrode plate is unlikely to be wrinkled, curved, or cracked even if a difference in length occurs between the portion of the substrate where the active material layer is formed and the substrate exposed portion in the pressing treatment. That is, since the substrate exposed portion is cut at a constant interval, even if a difference in length occurs between the portion of the substrate where the active material layer is formed and the substrate exposed portion due to the pressing treatment, the strain is released at the position where the substrate exposed portion is cut, so that the electrode plate is unlikely to be wrinkled, curved, or cracked.

However, in the course of development by the inventors, a crack was sometimes generated at the base of the tab portion even in the case where the electrode plate was pressed after the substrate exposed portion was cut into a predetermined shape to form the tab portion. The inventors have found that such a problem appears significantly when the packing density of the active material layer after the compression treatment is 3.58 g/cm³ or more and the width of the tab portion is 10 mm or more.

Although it is possible to suppress the occurrence of a crack at the base of the tab portion to some extent by making the width of the tab portion smaller than 10 mm, it is not preferable because the electric resistance value may increase if the width of the tab portion is made too small.

The inventors have found that the occurrence of a crack at the base of the tab portion of the electrode body can be effectively suppressed by performing a treatment of compressing the active material layer after the cutout is provided in a region of the electrode plate that is at the base of the tab portion and in which the active material layer is famed.

Advantageous Effects of Invention

According to the present invention, a secondary battery having higher reliability can be provided.

DESCRIPTION OF EMBODIMENTS

Figure 1:
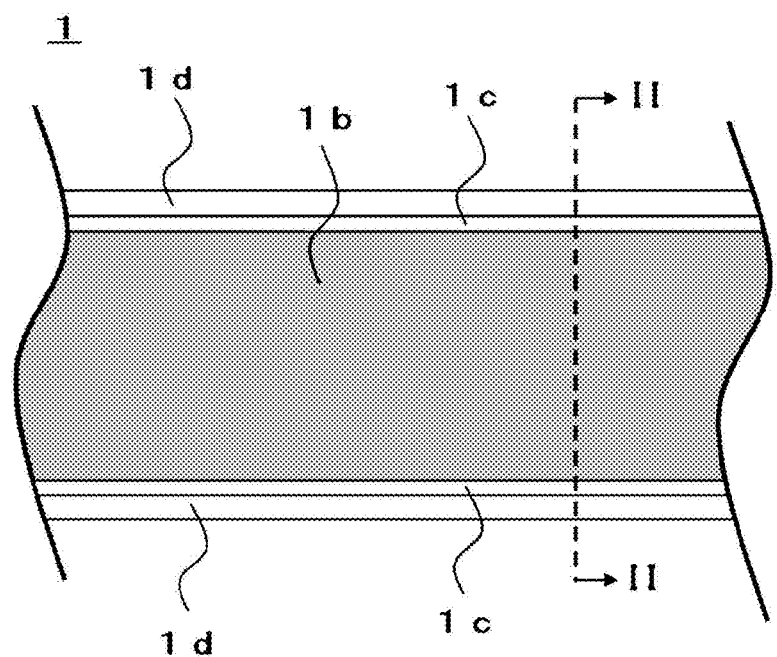
FIG. 1 is a plan view of a positive electrode plate before cutting.

An embodiment according to the present invention will be described as an example of a method for manufacturing a nonaqueous electrolyte secondary battery. The present invention is not limited to the following embodiment.

First, a method for manufacturing a positive electrode plate will be described.
[Preparation of Positive Electrode Active Material Layer Slurry]

Lithium nickel cobalt manganese complex oxide as a positive electrode active material, polyvinylidene fluoride (PVdF) as a binder, carbon material as a conductive agent, and N-methyl-2-pyrrolidone (NMP) as a dispersion medium are kneaded such that the mass ratio of lithium nickel cobalt manganese composite oxide:PVdF:carbon material is 97.5:1:1.5 to prepare a positive electrode active material layer slurry. The content of the positive electrode active material in the positive electrode active material layer is preferably 95% by mass or more, and preferably 99% by mass or less. The content of the binder in the positive electrode active material layer is preferably 0.5% by mass or more, and preferably 3% by mass or less.
[Preparation of Protective Layer Slurry]

Alumina powder, graphite as a conductive agent, polyvinylidene fluoride (PVdF) as a binder, and N-methyl-2-pyrrolidone (NMP) as a dispersion medium are kneaded such that the mass ratio of alumina powder:graphite:PVdF is 83:3:14 to prepare a protective layer slurry. The content of the binder in the protective layer is preferably 5% by mass or more, more preferably 8% by mass or more, and still more preferably 10% by mass or more. The protective layer may be composed only of a binder, but preferably contains ceramic particles such as alumina, zirconia, titania and silica. It is preferable that the protective layer contain no positive electrode active material. Even when the protective layer contains the positive electrode active material, the content thereof is preferably 5% by mass or less, more preferably 1% by mass or less.
[Active Material Layer Forming Step and Protective Layer Forming Step]

The positive electrode active material layer slurry and the protective layer slurry prepared by the above method are applied to both sides of an aluminum foil having a thickness of 15 μm as a positive electrode substrate by a die coater. At this time, the positive electrode active material layer slurry is applied to the center in the width direction of the positive electrode substrate, and the protective layer slurry is applied to both ends in the width direction of the region where the positive electrode active material layer slurry is applied. The positive electrode active material layer slurry and the protective layer slurry can be combined in the vicinity of the discharge port inside the die head of one die coater, and the positive electrode active material layer slurry and the protective layer slurry can be simultaneously applied onto the positive electrode substrate. However, it is not necessary to simultaneously apply the positive electrode active material layer slurry and the protective layer slurry to the positive electrode substrate.

The positive electrode substrate coated with the positive electrode active material layer slurry and the protective layer slurry is dried to remove NMP in the slurries. Thus, a positive electrode active material layer and a protective layer are famed.

Figure 2:
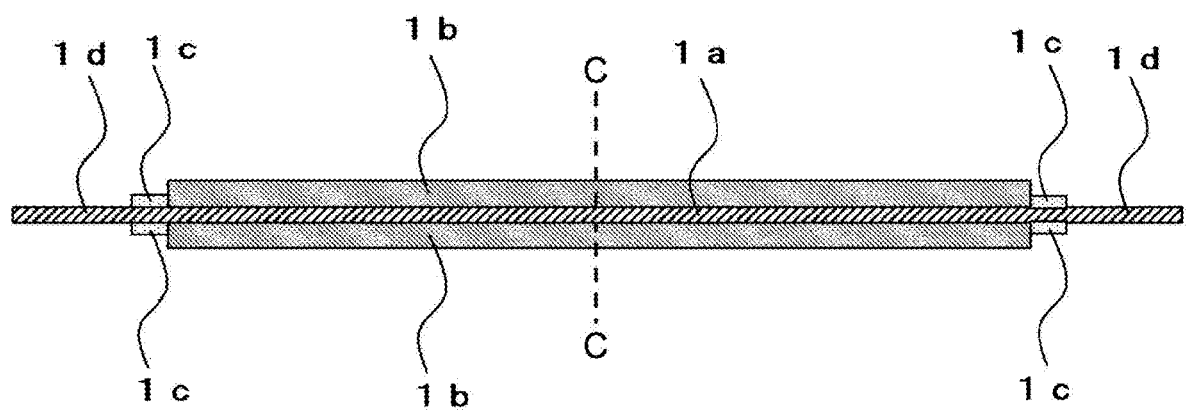
FIG. 2 is a sectional view of the positive electrode plate taken along line II-II of FIG. 1.

FIG. 1 is a plan view of a positive electrode plate 1 before the compression treatment fabricated by the above method. FIG. 2 is a sectional view of the positive electrode plate 1 taken along line II-II of FIG. 1. As shown in FIGS. 1 and 2, a positive electrode active material layer 1b is formed on both sides of a positive electrode substrate 1a along the longitudinal direction of the positive electrode substrate 1a. A protective layer 1c is formed at both ends in the width direction of a region of the positive electrode substrate 1a where the positive electrode active material layer 1b is formed. At both ends in the width direction of the positive electrode plate 1, a positive electrode substrate exposed portion 1d is formed along the longitudinal direction of the positive electrode plate 1. Here, the thickness of the positive electrode active material layer 1b is larger than the thickness of the protective layer 1c.

The positive electrode plate 1 shown in FIGS. 1 and 2 is cut along line C-C in FIG. 2.
[Tab Portion Forming Step and Cutout Forming Step]

In the positive electrode plate 1 shown in FIGS. 1 and 2, an energy beam such as a laser beam is irradiated to the positive electrode substrate exposed portion 1d, thereby cutting the positive electrode substrate exposed portion 1d into a predetermined shape to form positive electrode tab portions 1e. At this time, at the same time as formation of the tab portion, an energy beam such as a laser beam is irradiated to a region at the base of the tab portion where the positive electrode active material layer 1b and the protective layer 1c are provided, thereby providing cutouts 1f.

Figure 3:
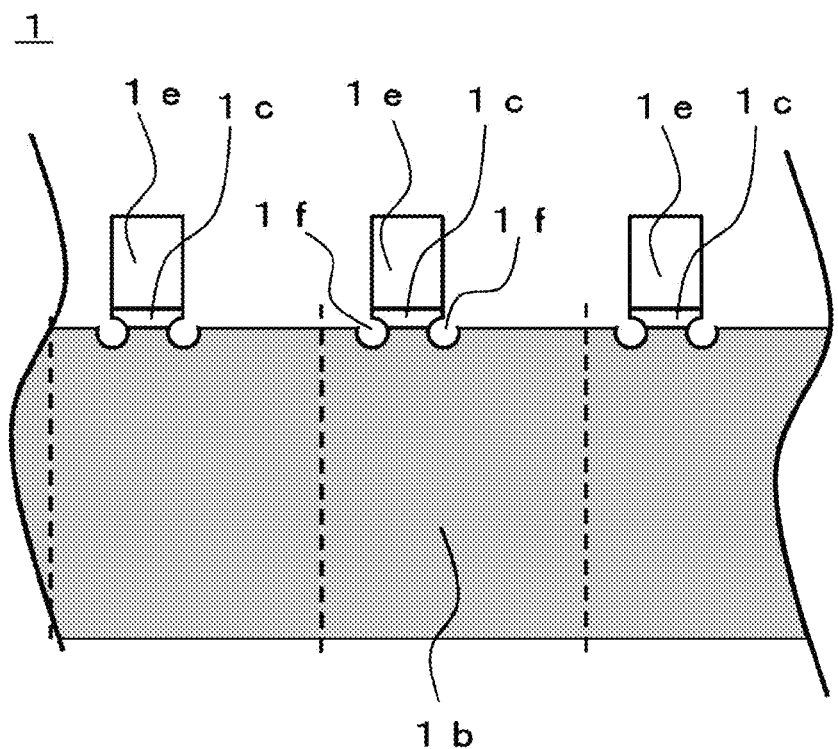
FIG. 3 is a plan view of the positive electrode plate after forming tab portions.

FIG. 3 is a diagram showing a positive electrode plate 1 provided with positive electrode tab portions 1e and cutouts 1f. As shown in FIG. 3, the positive electrode tab portions 1e are formed at an end of the positive electrode plate 1. The positive electrode tab portions 1e are provided so as to protrude from a region of the positive electrode substrate 1a where the positive electrode active material layer 1b is formed.

The formation of the tab portions and the formation of the cutouts may be performed separately. The formation of the tab portions and the formation of the cutouts may be performed by different methods. For example, the formation of the tab portions may be performed by press punching, and then the formation of the cutouts may be performed by irradiation with an energy beam.

[Compressing Step]

Figure 5:
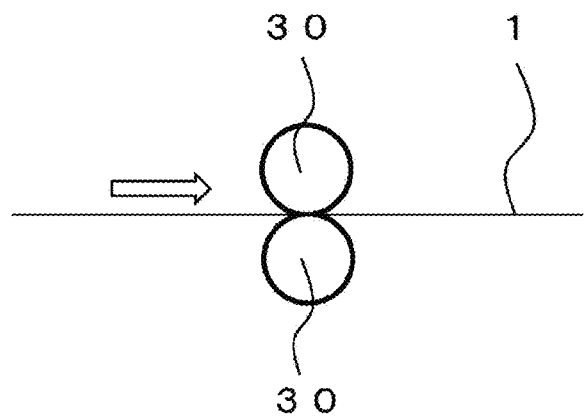
FIG. 5 is a diagram showing the step of compressing the positive electrode plate.

As shown in FIG. 5, a positive electrode plate 1 provided with positive electrode tab portions 1e and cutouts 1f is passed between a pair of press rollers 30, and the positive electrode active material layer 1b is compressed. Thereby, the packing density of the positive electrode active material layer 1b is increased. The packing density of the positive electrode active material layer 1b is preferably set to 3.58 g/cm$^3$ or more.

Figure 6:
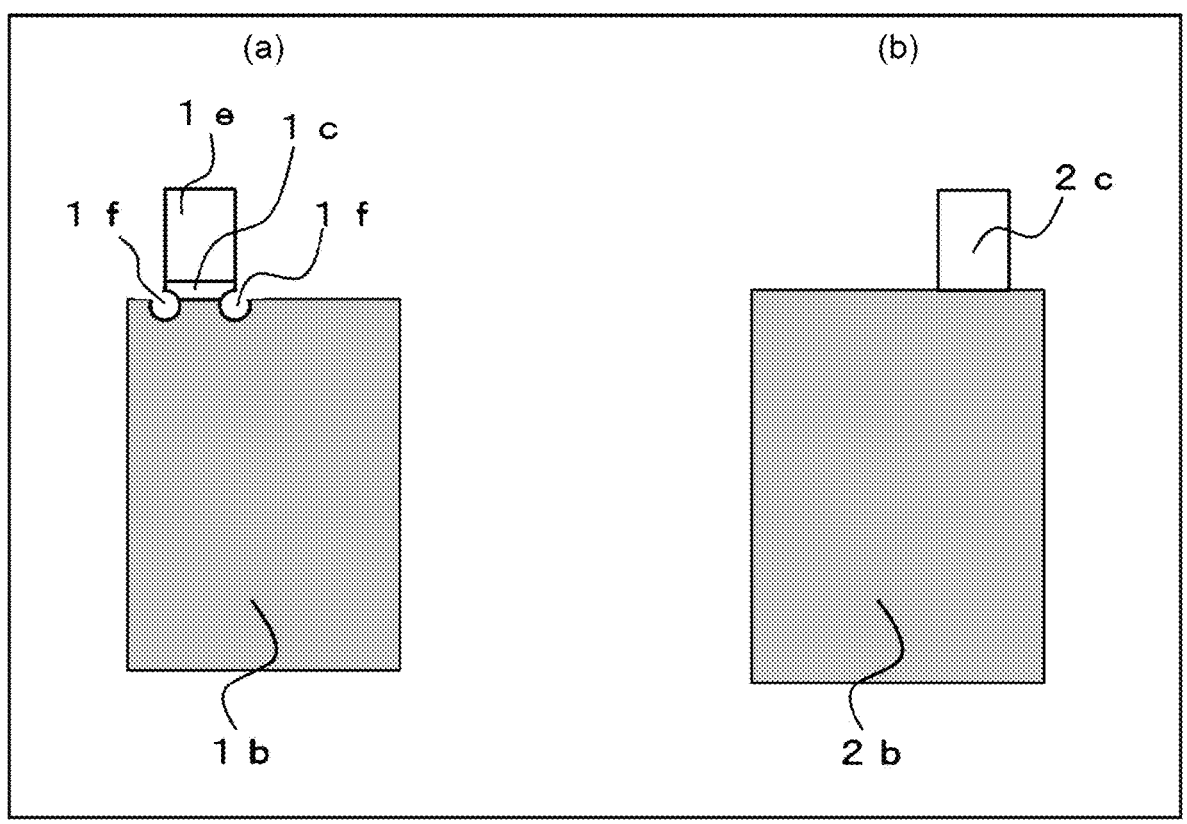
FIG. 6 is a plan view of a positive electrode plate after cutting and a negative electrode plate after cutting.

Thereafter, the positive electrode plate 1 subjected to compression treatment is cut into a predetermined shape, and a positive electrode plate 1 shown in (a) of FIG. 6 is completed. Broken lines in FIG. 3 indicate positions at which the positive electrode plate 1 is cut.

When a positive electrode plate 1 is fabricated by the above method, cutouts 1f are provided in a region of the positive electrode plate 1 that is at the base of the positive electrode tab portion 1e and in which the positive electrode active material layer 1b is formed, and then the positive electrode active material layer 1b is compressed. Therefore, a crack can be prevented from being generated at the base of the positive electrode tab portion 1e of the positive electrode plate 1 due to the compression treatment. The reason why such an effect can be obtained is considered as follows.

The region of the positive electrode substrate in which the positive electrode active material layer is formed is rolled by the rolling treatment. The tab portion, where the positive electrode active material layer is not formed, has a smaller thickness than the portion where the positive electrode active material layer is present. Therefore, the tab portion is not rolled in the compression treatment. In this case, in the positive electrode substrate on which the positive electrode active material layer is formed, a portion adjacent to the tab portion is fixed to the tab portion, which is not rolled. On the other hand, a portion that is slightly distant from the tab portion is rolled and is pulled in the left-right direction (in the longitudinal direction of the positive electrode substrate).

In the positive electrode plate 1, cutouts 1f are provided in the region at the base of the positive electrode tab portion 1e where the positive electrode active material layer 1b is formed. Therefore, the starting point of a crack is removed, and a crack can be prevented from being generated.

Figure 4:
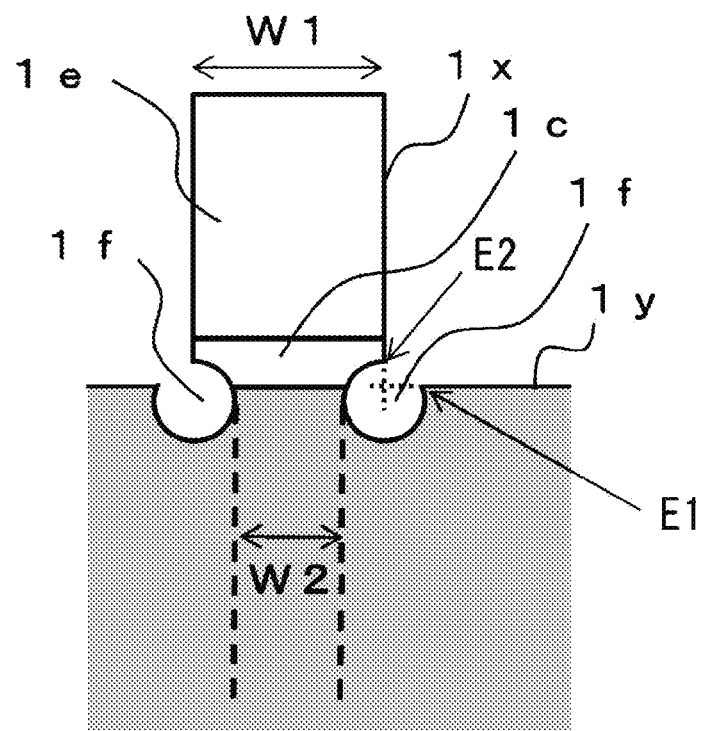
FIG. 4 is an enlarged view of the vicinity of the tab portion in FIG. 3.

As shown in FIG. 4, the cutout 1f is preferably famed in a region including an intersection of an extension line of a side edge 1x of the positive electrode tab portion 1e of the positive electrode plate 1 and an extension line of the upper edge 1y of the region of the positive electrode plate 1 where the positive electrode active material layer 1b is formed (the edge from which the positive electrode tab portion 1 protrudes). Thereby, it is possible to more effectively prevent a crack from being generated at the base of the positive electrode tab portion 1e of the positive electrode plate 1 due to the compression treatment.

As shown in FIG. 4, the cutouts 1f are preferably formed in the region where the positive electrode active material layer 1b is formed. Thus, since the edges of the cutouts 1f are reinforced by the positive electrode active material layer 1b, it is possible to effectively prevent the positive electrode plate 1 from cracking or breaking from the cutouts 1f after the positive electrode plate 1 is fabricated. Further, since the first edge E1 of the cutout 1f is covered with the positive electrode active material layer 1b, it is possible to reliably prevent the first edge E1 from penetrating the separator and coming into contact with the negative electrode plate 2.

It is preferable that, as shown in FIG. 4, cutouts 1f be provided on both sides of the base of the positive electrode tab portion 1e, and a positive electrode active material layer 1b be formed on a straight line connecting the cutouts 1f at the shortest distance. Thus, since the portion connecting the two cutouts 1f at the shortest distance is reinforced by the positive electrode active material layer 1b, it is possible to effectively prevent the positive electrode plate 1 from cracking or breaking from the cutouts 1f after the positive electrode plate 1 is fabricated.

As shown in FIG. 4, the cutouts 1f are preferably formed in the region where the protective layer 1c is formed. Thus, since the edges of the cutouts 1f are reinforced by the protective layer 1c, it is possible to effectively prevent the positive electrode plate 1 from cracking or breaking from the cutouts 1f after the positive electrode plate 1 is fabricated. Further, since the second edge E2 of the cutout 1f is covered with the protective layer 1c, it is possible to reliably prevent the second edge E2 from penetrating the separator and coming into contact with the negative electrode plate 2.

It is preferable that, in the protruding direction of the positive electrode tab portion 1e, the first edge E2 be located closer to the tip of the positive electrode tab portion 1e than the first edge E1, the second edge E2 be covered with the protective layer 1c, and the conductivity of the protective layer 1c be lower than the conductivity of the positive electrode active material layer 1b. Since the second edge E2 penetrates the separator more easily than the first edge E1, the layer formed on the second edge E2 is the protective layer 1c with lower conductivity, which improves safety.

It is preferable that, as shown in FIG. 4, the entire edges of the cutouts 1f be disposed in the region where the positive electrode active material layer 1b is formed or the region where the protective layer 1c is formed. Thereby, it is possible to effectively prevent cracks from being generated from the edges of the cutouts 1f.

The cutouts 1f are preferably formed by irradiation with an energy beam such as a laser beam. Thereby, the edges of the cutouts 1f are prevented from becoming sharp and have a more rounded shape, and therefore it is possible to more reliably prevent cracks from being generated therefrom. It is preferable that, in the positive electrode substrate 1a, the thickness of the edges of the cutouts 1f is larger than that of the other region.

Although the shape of the cutouts 1f is not particularly limited, the cutouts 1f preferably have a circular arc shape. Thereby, it is possible to prevent cracks from being generated therefrom. For example, each cutout is preferably a part of a circle having a diameter of 1 to 10 mm.

As shown in FIG. 4, in the width direction of the positive electrode tab portion 1e, the end of each cutout 1f closer to the center of the positive electrode tab portion 1e is preferably located closer to the center of the positive electrode tab portion 1e than the end in the width direction of the positive electrode tab portion 1e. Thereby, it is possible to more effectively prevent the electrode plate from tearing when the positive electrode plate 1 is pressed.

The width W1 of the positive electrode tab portion 1e is preferably 12 mm to 30 mm. The smaller the width W1 of the positive electrode tab portion 1e, the less likely the crack generated during the step of compressing the positive electrode plate 1 is to be generated. However, when the width W1 of the positive electrode tab portion 1 is small, the electric resistance increases, which is not preferable. According to the present invention, it is possible to provide a positive electrode plate 1 that suppresses an increase in electric resistance and is less likely to crack.

As shown in FIG. 4, it is preferable that cutouts 1f be provided on both sides of the base of the positive electrode tab portion 1e. In this case, the width W2 of the portion connecting the pair of cutouts 1f at the shortest distance is preferably ½ to ⅘ of the width W1 of the tab portion. When the width W2 of the portion connecting the cutouts at the shortest distance is small, it is not preferable because the resistance value increases and there is a possibility of fusion. However, it is preferable that the portion connecting the cutouts at the shortest distance be a portion where the active material layer is formed, because the fusion can be suppressed.

It is preferable that only one positive electrode tab portion 1e be provided in one positive electrode plate 1. Since it is preferable that the electrode body be fabricated while the region of the positive electrode plate 1 where the positive electrode active material layer 1b is famed is kept flat, it is preferable to use for a battery including a stacked electrode body.

It is preferable that each cutout 1f be a part of a circle, and the center of the circle be located at the portion where the positive electrode active material layer 1b is famed (that is, the center of the circle be located below an extension line of the upper edge 1y of the region where the positive electrode active material layer 1b is formed).

[Method for Manufacturing Prismatic Secondary Battery]

A method for manufacturing a prismatic second battery 20 using the positive electrode plate 1 fabricated by the above method will be described.

[Fabrication of Negative Electrode Plate]

A negative electrode active material layer slurry containing graphite as a negative electrode active material, styrene butadiene rubber (SBR) as a binder, carboxymethyl cellulose (CMC) as a thickener, and water is prepared. This negative electrode active material layer slurry is applied to both sides of a rectangular copper foil having a thickness of 8 μm as a negative electrode substrate. Then, by drying this, water in the negative electrode active material layer slurry is removed, and a negative electrode active material layer is famed on the negative substrate. Thereafter, the negative electrode active material layer is compressed so as to have a predetermined thickness. The negative electrode plate thus obtained is cut into a predetermined shape, and a negative electrode plate shown in (b) of FIG. 6 is made.

[Fabrication of Electrode Body]

A plurality of positive electrode plates 1 and a plurality of negative electrode plates 2 made by the above method are stacked with polyolefin separators therebetween to fabricate a stacked electrode body 3. Here, each of the positive electrode plates 1 and the negative electrode plates 2 is not curved, and has a flat shape. In the stacked electrode body 3, stacked positive electrode tab portions 1e and stacked negative electrode tab portions 2c protrude from one end thereof. In the stacked electrode body 3, the shape of the separators is not particularly limited. A plurality of flat separators may be used. A plurality of bag-shaped separators in which one of the electrode plates is disposed may be used. Alternatively, a separator may be folded zigzag.

[Assembling of Sealing Body]

Figure 7:
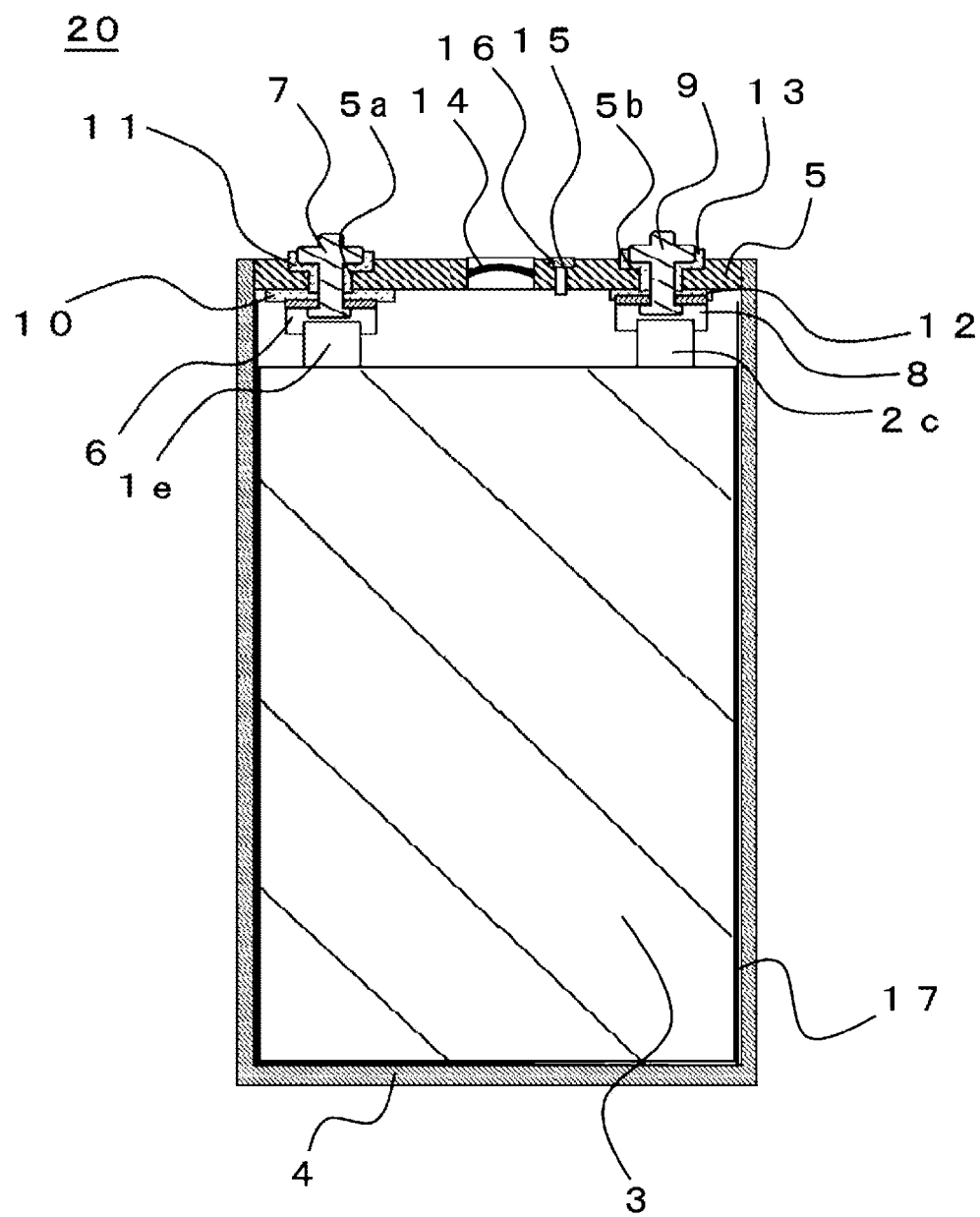
FIG. 7 is a sectional view of a prismatic secondary battery.

As shown in FIG. 7, a sealing plate 5 has a positive electrode terminal mounting hole 5a and a negative electrode terminal mounting hole 5b. An insulating member 10 and a positive electrode current collector 6 are disposed around the positive electrode terminal mounting hole 5a on the inner side of the battery. An insulating member 11 is disposed around the positive electrode terminal mounting hole 5a on the outer side of the battery. Then, a positive electrode terminal 7 is inserted from the outer side of the battery into a through-hole provided in each of the insulating member 11, the insulating member 10 and the positive electrode current collector 6, and the tip of the positive electrode terminal 7 is fixed by caulking onto the positive electrode current collector 6. The caulking portion of the positive electrode terminal 7 is preferably welded to the positive electrode current collector 6.

An insulating member 12 and a negative electrode current collector 8 are disposed around the negative electrode terminal mounting hole 5b on the inner side of the battery. An insulating member 13 is disposed around the negative electrode terminal mounting hole 5b on the outer side of the battery. Then, a negative electrode terminal 9 is inserted from the outer side of the battery into a through-hole provided in each of the insulating member 13, the insulating member 12 and the negative electrode current collector 8, and the tip of the negative electrode terminal 9 is fixed by caulking onto the negative electrode current collector 8. The caulking portion of the negative electrode terminal 9 is preferably welded to the negative electrode current collector 8.

[Connecting Tab Portion and Current Collector]

The stacked positive electrode tab portions 1e of the stacked electrode body 3 are connected by welding to the positive electrode current collector 6, and the stacked negative electrode tab portions 2c of the stacked electrode body 3 are connected by welding to the negative electrode current collector 8. As the connection by welding, resistance welding, laser welding, ultrasonic welding, or the like can be used.

[Assembling of Secondary Battery]

The stacked electrode body 3 covered with an insulating sheet 17 is inserted into a bottomed prismatic outer casing 4. Thereafter, the outer casing 4 and the sealing plate 5 are connected by welding to each other, and the opening of the outer casing 4 is sealed. Thereafter, a nonaqueous electrolytic solution containing an electrolyte and a solvent is injected into the outer casing 4 through an electrolytic solution injection hole 15 provided in the sealing plate 5. Thereafter, the electrolytic solution injection hole 15 is sealed with a sealing plug 16.

The sealing plate 5 is provided with a gas discharge valve 14 that breaks when the pressure in the battery reaches a predetermined value or more and discharges the gas in the battery to the outside. A current interruption mechanism may be provided in the conductive path between the positive electrode plate 1 and the positive electrode terminal 7 or the conductive path between the negative electrode plate and the negative electrode terminal 9. It is preferable that the current interrupting mechanism operate to cut off the conductive path when the pressure in the battery reaches a predetermined value or more. The operating pressure of the current interrupting mechanism is set lower than the operating pressure of the gas discharge valve.

In the above embodiment, cutouts 1f are provided in the positive electrode plate 1, but cutouts may be provided in a portion at the base of the negative electrode tab portion 2c of the negative electrode plate 2 where the negative electrode active material layer 2b is formed.

Although the protective layer 1c is provided on the positive electrode plate 1 in the above embodiment, the protective layer 1c is not essential and the protective layer 1c may not be provided.

Next, modifications will be described.
[Modification 1]

Figure 8:
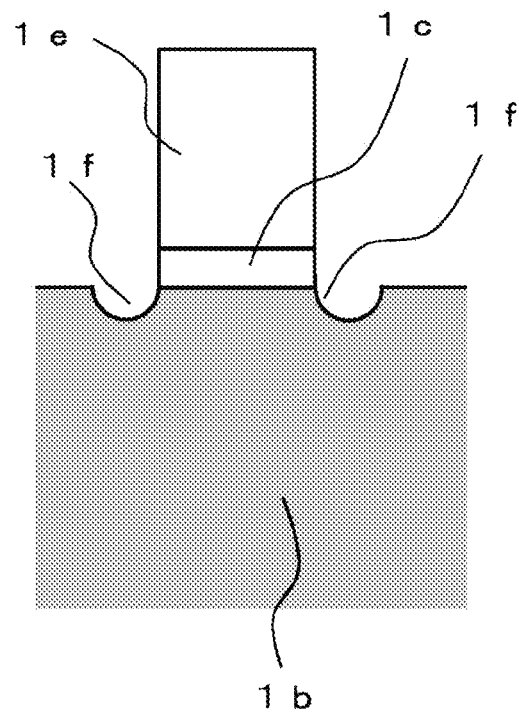
FIG. 8 is an enlarged view of the vicinity of a tab portion in a positive electrode plate according to Modification 1.

FIG. 8 is a plan view of a positive electrode plate 1 according to Modification 1. The positive electrode plate 1 according to Modification 1 differs only in the formation positions of the cutouts 1f, and the other configuration and manufacturing procedure are the same as those of the positive electrode plate 1 in the above-described embodiment.

The positive electrode plate 1 according to Modification 1 differs from the positive electrode plate 1 according to the above embodiment in that, when each cutout 1f is considered to be a part of a circle, the center of the circle is shifted away from the center of the positive electrode tab portion 1e, and the center of the circle is shifted in the protruding direction of the tab portion. In the positive electrode plate 1 according to Modification 1, in the width direction of the positive electrode tab portion 1e, the end of each cutout 1f closer to the center of the positive electrode tab portion 1e coincides with the end of the positive electrode tab portion 1e.
[Modification 2]

Figure 9:
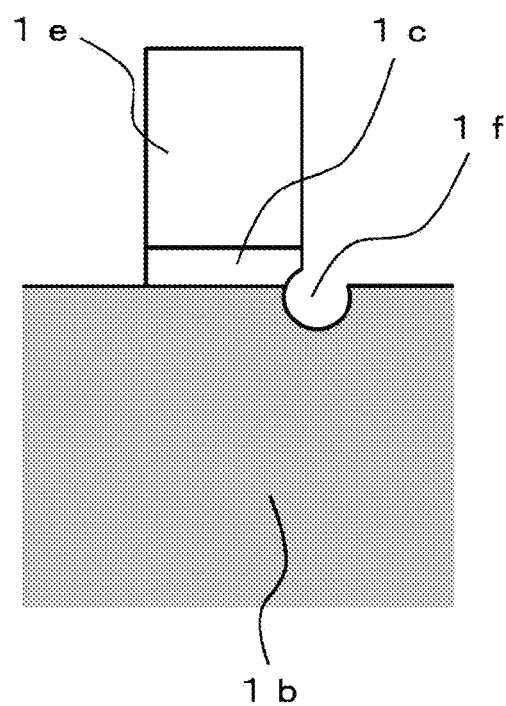
FIG. 9 is an enlarged view of the vicinity of a tab portion in a positive electrode plate according to Modification 2.

FIG. 9 is a plan view of a positive electrode plate 1 according to Modification 2. The positive electrode plate 1 according to Modification 2 differs only in the formation positions of the cutouts 1f, and the other configuration and manufacturing procedure are the same as those of the positive electrode plate 1 in the above-described embodiment.

In the positive electrode plate 1 according to Modification 2, a cutout 1f is provided only on one side in the width direction of the base of the positive electrode tab portion 1e. In such a case, the cutout 1f is preferably provided on the upstream side (the side that is pressed first) of the positive electrode plate 1 in the rolling treatment. The crack generated at the base of the positive electrode tab portion 1e when the positive electrode plate 1 is compressed, tends to be generated on the upstream side of the positive electrode plate 1 in the rolling treatment. Therefore, with the configuration of Modification 2, a high-quality positive electrode plate 1 can be obtained while minimizing the decrease in battery capacity.
<Others>

The present invention is applicable to both a positive electrode plate and a negative electrode plate. However, it is particularly effective to apply the present invention to a positive electrode plate. It is particularly effective to apply the present invention to a positive electrode plate having a positive electrode active material layer having a packing density of 3.58 g/cm$^3$ or more after the compression treatment.

The substrate in the present invention is preferably a non-porous metal foil. The positive electrode substrate is preferably an aluminum foil or an aluminum alloy foil. The negative electrode substrate is preferably a copper foil or a copper metal foil.

The electrode body in the present invention is preferably a stacked electrode body including a plurality of flat positive electrode plates and a plurality of flat negative electrode plates. The shape of separators disposed between the positive electrode plates and the negative electrode plates is not particularly limited. Flat separators can be disposed between the positive electrode plates and the negative electrode plates. Alternatively, the separators may be formed in a bag shape and the positive electrode plates may be disposed therein. Alternatively, a separator may be folded zigzag and the positive electrode plates and the negative electrode plate may be disposed therebetween.

A lithium transition metal composite oxide is preferable as the positive electrode active material in the present invention. In particular, a lithium transition metal composite oxide containing at least one of nickel, cobalt and manganese is preferable.

A material capable of absorbing and releasing lithium ions can be used as the negative electrode active material in the present invention. Materials capable of absorbing and releasing lithium ions include carbon materials such as graphite, hardly graphitizable carbon, easily graphitizable carbon, fibrous carbon, coke and carbon black. Examples of the non-carbon material include silicon, tin, and alloys and oxides mainly containing them. A carbon material and a non-carbon material can be mixed.

Examples of the binder contained in the active material layer and the protective layer of the electrode plate include polyvinylidene fluoride (PVDF), polytetrafluoroethylene, polyethylene, polypropylene, aramid resin, polyamide, polyimide, polyamide imide, polyacrylonitrile, polyacrylic acid, poly(methyl acrylate), poly(ethyl acrylate), poly(hexyl acrylate), polymethacrylic acid, poly(methyl methacrylate), poly (ethyl methacrylate), poly(hexyl methacrylate), polyvinyl acetate, polyvinylpyrrolidone, polyether, polyether sulfone, hexafluoropolypropylene, styrene butadiene rubber, carboxymethyl cellulose, acrylic rubber, and acrylate binder (ester or salt of acrylic acid). These may be used alone or in combination of two or more. The binder contained in the active material layer and the binder contained in the protective layer may be the same or different. The binder is preferably made of resin.

The mass ratio of the binder contained in the protective layer to the protective layer is preferably 5% by mass or more, and more preferably 10% by mass or more. The mass ratio of the binder contained in the protective layer to the protective layer is preferably 95% by mass or less. However, the protective layer may be composed only of a binder. However, the protective layer preferably contains at least one of alumina, zirconia, titania and silica as ceramic particles.
<Other Invention>

A method for manufacturing an electrode plate for a secondary battery according to another invention is a method for manufacturing an electrode plate for a secondary battery including a substrate composed of a metal foil, an active material layer containing an active material famed on the substrate, the substrate on the surface of which the active material layer is not formed being provided as a tab portion, a protective layer containing ceramic particles and a binder being famed on the substrate in a portion that is at the base of the tab portion and adjacent to the active material layer, the method including: a cutout forming step of providing a cutout in a portion that is at the base of the tab portion and in which the active material layer and the protective layer are formed; and a compressing step of compressing the active material layer after the cutout forming step.

With the method for manufacturing an electrode body according to the other invention, it is possible to more effectively prevent a crack from being generated at the base of the tab portion when the electrode plate is compressed. Since the cutout is formed in a region of the substrate where the active material layer and the protective layer are famed, the edge of the cutout is reinforced by the active material layer and the protective layer. Therefore, it is possible to effectively prevent the electrode plate from cracking from the cutout. In addition, since the edge of the cutout is covered with the active material layer and the protective layer, it is possible to prevent the edge from penetrating the separator and coming into contact with the opposing electrode plate.

The electrode plate according to the other invention can be used as at least one of a positive electrode plate and a negative electrode plate. It is possible to fabricate a rolled electrode body using the electrode plate according to the other invention, and it is also possible to fabricate a stacked electrode body.

REFERENCE SIGNS LIST 1 positive electrode plate
   1a positive electrode substrate
   1b positive electrode active material layer
   1c protective layer
   1d positive electrode substrate exposed portion
   1e positive electrode tab portion
   1f cutout
negative electrode plate
   2b negative electrode active material layer
   2c negative electrode tab portion (negative electrode substrate exposed portion)
3 stacked electrode body
3 outer casing
4 sealing plate
   5a positive electrode terminal mounting hole
   5b negative electrode terminal mounting hole
6 positive electrode current collector
7 positive electrode terminal
8 negative electrode current collector
9 negative electrode terminal
10 insulating member
11 insulating member
12 insulating member
13 insulating member
14 gas discharge valve
15 electrolytic solution injection hole
16 sealing plug
17 insulating sheet
20 prismatic secondary battery
30 press roller

The invention claimed is:

1. A method for manufacturing a secondary battery including a stacked electrode body including a plurality of first electrode plates and a plurality of second electrode plates, the first electrode plates each having a belt-like substrate, an active material layer formed on the belt-like substrate, and a tab portion composed of a substrate exposed portion where the active material layer is not formed, wherein the belt-like substrate and the tab portion are formed of a single integral piece of material, the method comprising:
   an active material layer formation step of forming the active material layer on both sides of the belt-like substrate such that a substrate exposed portion is formed along a longitudinal direction of the belt-like substrate;
   a tab portion formation step of cutting the substrate exposed portion into a predetermined shape to form the tab portion;
   a cutout forming step of providing at least one cutout in a peripheral region of each first electrode plate that is located directly adjacent to a base of the tab portion and in which the active material layer is formed, wherein the peripheral region includes at least a portion of the belt-like substrate which is directly adjacent to and distinct from the tab portion and has the active material layer formed thereon; and
   a compressing step of compressing the active material layer after the cutout forming step,
   wherein a protective layer containing ceramic particles and a binder is formed on the tab portion before the cutout forming step, and
   wherein the at least one cutout is also formed in a region where the protective layer is formed.

2. The method for manufacturing a secondary battery according to claim 1,
   wherein the first electrode plates are positive electrode plates, and the second electrode plates are negative electrode plates,
   wherein the belt-like substrate is an aluminum foil or an aluminum alloy foil, and
   wherein the packing density of the active material layer after the compression step is 3.58 g/cm$^3$ or more.

3. The method for manufacturing a secondary battery according to claim 1, wherein, in the cutout forming step, the at least one cutout is provided using an energy beam.

4. The method for manufacturing a secondary battery according to claim 1, wherein, in the width direction of the tab portion, the end of the at least one cutout closer to the center of the tab portion is located closer to the center of the tab portion than the end in the width direction of the tab portion.

5. The method for manufacturing a secondary battery according to claim 1, wherein the at least one cutout comprises two cutouts, and, in the width direction of the tab portion, the two cutouts are provided on both sides of the base of the tab portion.

* * * * *